US008472056B2

(12) United States Patent
Oshima et al.

(10) Patent No.: US 8,472,056 B2
(45) Date of Patent: Jun. 25, 2013

(54) PRINTING SYSTEM AND PRINTING APPARATUS TERMINAL FOR EFFICIENT PROCESSING OF PRINTING CONTENT

(75) Inventors: Yasuhiro Oshima, Matsumoto (JP); Kenji Sakuda, Suwa (JP); Takafumi Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 414 days.

(21) Appl. No.: 12/729,155

(22) Filed: Mar. 22, 2010

(65) Prior Publication Data

US 2010/0238502 A1     Sep. 23, 2010

(30) Foreign Application Priority Data

Mar. 23, 2009   (JP) ................. 2009-069780

(51) Int. Cl.
*G06F 3/12*     (2006.01)
(52) U.S. Cl.
USPC ..................... 358/1.15; 358/1.16
(58) Field of Classification Search
USPC ................................. 358/1.1–3.29
See application file for complete search history.

(56) References Cited

U.S. PATENT DOCUMENTS

| 2005/0221807 | A1  | 10/2005 | Karlsson et al. |
| 2006/0023247 | A1  | 2/2006  | Yamakawa |
| 2006/0132616 | A1* | 6/2006  | Tanaka et al. ............. 348/211.3 |
| 2008/0016312 | A1* | 1/2008  | Thorp et al. ................ 711/170 |
| 2009/0002730 | A1* | 1/2009  | Yamada et al. ............. 358/1.9 |

FOREIGN PATENT DOCUMENTS

| JP | 2002-178613 A | 6/2002 |
| JP | 2003-178028 A | 6/2003 |
| JP | 2005-109701 A | 4/2005 |
| JP | 2005-516320 T | 6/2005 |
| JP | 2006-043962 A | 2/2006 |
| JP | 2007-179328 A | 7/2007 |
| JP | 2007-213261 A | 8/2007 |
| JP | 2008-186270 A | 8/2008 |
| JP | 2009-020741 A | 1/2009 |
| WO | WO 03/065701 A1 | 8/2003 |

* cited by examiner

*Primary Examiner* — Benny Q Tieu
*Assistant Examiner* — Marcellus Augustin
(74) *Attorney, Agent, or Firm* — Kilpatrick Townsend & Stockton LLP

(57) ABSTRACT

A printing system includes a transmitting terminal, which transmits printable printing contents, and a printing apparatus terminal, which receives and prints the printing contents, which are connected to the printing system via an Internet protocol network.

7 Claims, 10 Drawing Sheets

FIG. 3

SDP OF INVITE MESSAGE m=application 8080 TCP newprint1
C=IN IP4 xxx.xxx.xxx.xxx
a=setup:passive
a=connection:new
a=control: newprint/capability.xml

FIG. 4

SDP OF 200 OK MESSAGE m=application 3180 TCP newprint1
a=setup:active
a=connection:new

[1] CAPABILITY REQUEST

```
01:GET /newprint/capability.xml HTTP/1.1
02:HOST: xxx.xxx.xxx.xxx
03:Accept: text/xml
```

FIG. 9

[2] CAPABILITY REPLY

```
01:HTTP/1.1 200 OK
02:Content-Type: text/xml
03:CONNECTION: close
04:
05:<?xml version="1.0" encoding="utf-8" ?>
06:<root xmlns:a="urn:schemas-newprint:device-1-0">
07:  <a:deviceCapability>
08:    <a:capabilityVariable>
09:      <a:name>DocumentFormat</a:name>
10:      <a:alloewdValueList>
11:        <a:allowedValue>application/xhtml-print-x</a:allowedValue>
12:      </a:alloewdValueList>
13:    </a:capabilityVariable>
14:    <a:capabilityVariable>
15:      <a:name>MediaType</a:name>
16:      <a:alloewdValueList>
17:        <a:allowedValue>stationery</a:allowedValue>
18:        <a:allowedValue>photographic</a:allowedValue>
19:      </a:alloewdValueList>
20:    </a:capabilityVariable>
21:    <a:httpRequest>Get</a:httpRequest>
22:  </a:deviceCapability >
23:  <a:documentInfo>
24:    <a:nextCapabilityURL>newprint/capability1.xml</a:nextCapabilityURL>
25:    <a:nortifyStatusURL>newprint/event/<a:nortifyStatusURL>
26:  </a:documentInfo>
27:</root>
```

FIG. 10

[3] PAGE INFORMATION REQUEST

```
01:GET /newprint/capability1.xml HTTP/1.1
02:HOST: xxx.xxx.xxx.xxx
03:Accept: text/xml
```

FIG. 11

[4] PAGE INFORMATION REPLY

```
01:HTTP/1.1 200 OK
02:Content-Type:text/xml charset="utf-8"
03:Content-Length:****
04:CONNECTION: close
05:
06:<?xml version="1.0" encoding="utf-8" ?>
07:<root xmlns:a="urn:schemas-newprint:device-1-0">
08:  <a:documentInfo>
09:    <a:documentURL>newprint/xhtmlprint1.xml</a:documentURL>
10:    <a:nextCapabilityURL>newprint/capability2.xml</a:nextCapabilityURL>
11:  </a:documentInfo>
12:</root>
```

FIG. 12

[5] DATA REQUEST

```
1:GET /newprint/xhtmlprint1.xml?DocumentFormat=application/xhtml-print-x&
      MediaType= photographic HTTP/1.1
2:HOST: xxx.xxx.xxx.xxx
3:Accept: text/xml
```

FIG. 13

[6] DATA REPLY

```
01:HTTP1.1 200 OK
02:Content-Type: text/xml
03:Transfer-encoding:chunked
04:CONNECTION: close XHTML-Print DOCUMENT
```

FIG. 14

EXAMPLE OF XHTML-Print DOCUMENT

```
01:<?xml version="1.0" encoding="UTF-8"?>
02:<!DOCTYPE html PUBLIC "-//W3C//DTD XHTML-Print 1.0//EN"
03:"http://www.w3.org/MarkUp/DTD/xhtml-print10.dtd">
04:<html xmlns="http://www.w3.org/1999/xhtml">
05: <head>
06:   <style type="text/css">
07:     @page{
08:         size:297mm 210mm;
09:         margin-top:4mm;
10:         margin-bottom:3.5mm;
11:         margin-left:4mm;
12:         margin-right:4mm;
13:     }
14:     body{
15:         margin:0mm;
16:         padding:0mm;
17:         width:289mm;
18:         overflow:hidden;
19:     }
20:     .docframe{
21:         width:289mm;
22:         white-space:pre;
23:     }
24:     .image_frame{
25:         width:289mm;
26:         height:150mm;
27:         margin:auto;
28:         padding-top:0mm;
29:         padding-bottom:0mm;
30:         overflow:hidden;
31:     }
32:     .image_data{
33:         width:286mm;
34:         height:150mm;
35:         margin-top:0mm;
36:         margin-left:0mm;
37:         display:block;
38:     }
39:     p{
40:         color:blue;
41:     }
42:     .page{
43:         page-break-after:always;
44:     }
45:   </style>
46: </head>
47: <body>
48:   <div class="page">
49:     <div class="docframe">From:epson-taro TEL:0123-456-7890 Date-Time:2009/02/25 14:45
50:       <div class="image_frame">
51:         <img class="image_data" src="epson.jpg" alt="image" type="image/jpeg"/>
52:       </div>
53:     </div>
54:     <p>
55:     </p>
56:   </div>
57: </body>
58:</html>
```

FIG. 15

[7] DATA REQUEST

```
01:GET /newprint/epson.jpeg HTTP/1.1
02:HOST: xxx.xxx.xxx.xxx
03:Range: bytes=0-1023
04:Accept: image/jpe
```

FIG. 16

[8] DATA REPLY

```
01:Content-Type: image/jpeg
02:Transfer-encoding:chunked
03:Content-Length: 1024
04:Content-Range: bytes 0-1023/4096
05:CONNECTION: close

DATA
```

FIG. 17

[9] PAGE INFORMATION REPLY

```
01:HTTP/1.1 200 OK
02:Content-Type:text/xml charset="utf-8"
03:Content-Length:****
04:CONNECTION: close
05:
06:<?xml version="1.0" encoding="utf-8" ?>
07:<root xmlns:a="urn:schemas-newprint:device-1-0">
08:  <a:documentInfo>
09:    <a:documentURL>none</a:documentURL>
10:    <a:nextCapabilityURL>none</a:nextCapabilityURL>
11:  </a:documentInfo>
12:</root>
```

PRINTING SYSTEM AND PRINTING APPARATUS TERMINAL FOR EFFICIENT PROCESSING OF PRINTING CONTENT

BACKGROUND

1. Technical Field

The entire disclosure of Japanese Patent Application No. 2009-069780, filed Mar. 23, 2009 is expressly incorporated by reference herein.

The present invention relates to a printing system and a printing apparatus terminal, and more particularly, to a printing system, which includes a transmitting terminal, which transmits printable printing contents, and a printing apparatus terminal, which receives and prints the printing contents, in which the transmitting terminal and printing apparatus terminal are connected to the printing system via an Internet protocol (IP) network, and to a printing apparatus terminal, which is connected with a transmitting terminal, which transmits printable printing contents, via the IP network, receives the printing contents from the contents terminal and prints the received printing contents.

2. Related Art

In the related art, as such a printing apparatus terminal, a facsimile (FAX) or a printer-connected Personal Computer (PC), which prints print data, received through a communication network such as a telephone line or the Internet, is known. The FAX, which receives the print data through the telephone line, responds to a call using a FAX signal, and prints the print data whenever receiving the data or after storing the data in a memory. The PC, which receives the print data through the Internet, stores the print data on an external storage device such as a hard disc drive, and then reads and prints the print data stored on the external storage device by running a printing application program. In addition, technologies relating to the transmission of information through the network are known, which are described in the patent documents, such as JP-A-2005-109701, JP-A-2003-178028, and JP-T-2005-516320.

Recently, a Next Generation Network (NGN), which has the flexibility and economic power of an Internet Protocol (IP) network while ensuring reliability and stability, has been proposed as a next-generation information communication network. This NGN uses the Session Initiation Protocol (SIP) as a protocol that generates, changes, and segments a session necessary for exchanging voice, image, or text messages with respect to two or more counterparts in application layers. In the establishment of the session between devices using the SIP, an offering terminal requests the establishment of a session from an answering terminal by transmitting an INVITE message to the offering terminal, in which the INVITE message contains a Uniform Resource Identifier (URI) indicating the location of the answering terminal on a network, and the answering terminal transmits "200 OK," which is a state code approving the establishment of the session, to the offering terminal. Data transmission between the terminals after the establishment of the session is typically a push mode, in which the offering terminal performs one-sided data transmission. However, data transmission may not be performed properly in some cases, depending on the performance of the answering terminal. In particular, if the answering terminal is a printing apparatus that prints data while receiving it, it is necessary to perform data transmission in response to printing speed. In addition, in some cases, it is intended to extract only image data from the printing contents and store the extracted image data.

SUMMARY

An advantage of some aspects of the invention is that a printing apparatus terminal and a printing apparatus terminal properly receives printing contents via an Internet Protocol (IP) network and stores only image data.

The printing apparatus terminal and a printing apparatus terminal of the present invention provide the following exemplary embodiments.

The printing system according to an exemplary embodiment of the invention may include a transmitting terminal, which transmits printable printing contents, and a printing apparatus terminal, which receives and prints the printing contents, which are connected to the printing system via an IP network. The transmitting terminal may include a transmitting-side connection establishment processor, which establishes a connection with the printing apparatus terminal via the IP network based on transmission and reception of a connection request message having printing identification information, which is for transmission and reception of the printing contents, and a printing contents transmitter, which functions as a server in a server-client model and transmits the printing contents to the printing apparatus terminal in response to a request from the printing apparatus terminal when the connection with the printing apparatus terminal is established based on the transmission of the connection request message having the printing identification information. The printing apparatus terminal may include a memory capable of temporarily storing data, a printing processor, which prints print data, a memory card-mounting section capable of mounting a memory card, a receiving-side connection establishment processor, which establishes a connection with the transmitting terminal via the IP network based on the transmission and reception of the connection request message having the printing identification information, and a received image storage controller, which functions as a server in the server-client model when the connection with the contents terminal is established based on the transmission of the connection request message having the printing identification information, receives the printing contents from the transmitting terminal by sending a request for transmission of the printing contents to the transmitting terminal, extracts only image data included in the received printing contents, and stores the extracted image data on the memory card mounted on the memory card-mounting section.

In the printing system according to an exemplary embodiment of the invention, when the connection between the transmitting terminal and the printing apparatus terminal is established via the IP network, in which the transmitting terminal transmits a connection request message having printing identification information, which is for transmission and reception of the printing contents, and the printing apparatus terminal receives the connection request message, the transmitting terminal functions as a server in a server-client model and the printing apparatus terminal functions as a client in the server client model, and the transmitting terminal transmits the printing contents to the printing apparatus terminal in response to a request for the transmission of the printing contents from the printing apparatus terminal. The printing apparatus terminal receives the printing contents transmitted from the transmitting terminal, extracts only image data included in the printing contents, and stores the extracted image data on the memory card mounted on the memory card-mounting section. As such, in the event of transmitting and receiving the printing contents, the transmitting terminal functions as a server in the server-client model and the printing apparatus terminal functions as a client in the server-client model; i.e., the transmission and reception of the printing contents is performed with the initiative of the printing apparatus terminal. Thus, it is possible to perform the transmission and reception of the printing contents depending on the performance of the printing apparatus terminal and to extract only the image data included in the printing contents and store the extracted image data on the memory card mounted on the memory card-mounting section. This, as a result, makes it possible to properly receive the printing contents via the IP network and store only the image data. Herein, the IP network may be a Next Generation Network (NGN), or the connection establishment may be based on the Session Initiation Protocol (SIP).

In an exemplary embodiment of the printing system, the received image storage controller may edit a new folder on the memory card and stores the image data, included in the printing contents, in the edited new folder. As such, it is possible to store only the image data, included in the printing contents, in the new folder. In the case of editing the new folder, the new folder can be titled by some or all of the year, month, date, hour, minute, and second when the folder is edited.

In an exemplary embodiment of the printing system, the received image storage controller may acquire, if a description document which describes locating information indicating a storage location of the image data included in the printing contents is included, the image data based on the location information described in the description document and store the acquired image data on the memory card. The description document may be, for example, an XHTML-Print document.

In an exemplary embodiment of the printing system, the printing apparatus terminal may also include an image display section, which displays the image data stored on the memory card mounted on the memory card-mounting section. As such, it is possible to display the image data, which is stored on the memory card.

The printing apparatus terminal according to an exemplary embodiment of the invention is connected with a transmitting terminal, which transmits printable printing contents, via an IP network, receives the printing contents from the contents terminal and prints the received printing contents. The printing apparatus terminal may include a memory capable of temporarily storing data; a printing processor, which prints the print data; a memory card-mounting section capable of mounting a memory card; a receiving-side connection establishment processor, which establishes a connection with the transmitting terminal via the IP network based on the transmission and reception of the connection request message having the printing identification information; and a received image storage controller, which functions as a server in the server-client model when the connection with the contents terminal is established based on the transmission of the connection request message having the printing identification information, receives the printing contents from the transmitting terminal by sending a request for transmission of the printing contents to the transmitting terminal, extracts only image data included in the received printing contents, and stores the extracted image data on the memory card mounted on the memory card-mounting section.

In the printing apparatus terminal according to an exemplary embodiment of the invention, when the connection between the transmitting terminal and the printing apparatus terminal is established via the IP network, based on the reception of the connection request message including the printing identification information, which is for the transmission and reception of the printing contents, transmitted from the transmitting terminal, the printing apparatus terminal functions as a client in the server client model, receives the printing contents transmitted from the transmitting terminal, extracts only image data included in the printing contents, and stores the extracted image data on the memory card mounted on the memory card-mounting section. As such, in the event of transmitting the printing contents, the transmitting terminal functions as a server in the server-client model and the printing apparatus terminal functions as a client in the server-client model; i.e., the transmission and reception of the printing contents is performed with the initiative of the printing apparatus terminal. Thus, it is possible to perform the transmission and reception of the printing contents depending on the performance of the printing apparatus terminal and to extract only the image data included in the printing contents and store the extracted image data on the memory card mounted on the memory card-mounting section. This, as a result, makes it possible to properly receive the printing contents via the IP network and store only the image data. Herein, the IP network may be an NGN, or the connection establishment may be based on the SIP.

In an exemplary embodiment of the printing apparatus terminal, the received image storage controller may edit a new folder on the memory card and stores the image data, included in the printing contents, in the edited new folder. As such, it is possible to store only the image data, included in the printing contents, in the new folder. In the case of editing the new folder, the new folder can be titled by some or all of the year, month, date, hour, minute, and second when the folder is edited.

In an exemplary embodiment of the printing apparatus terminal, the received image storage controller may acquire, if a description document which describes locating information indicating a storage location of the image data included in the printing contents is included, the image data based on the location information described in the description document and stores the acquired image data on the memory card. The description document may be, for example, an XHTML-Print document.

In an exemplary embodiment, the printing apparatus terminal may also include an image display section, which displays the image data stored on the memory card mounted on the memory card-mounting section. As such, it is possible to display the image data, which is stored on the memory card.

BRIEF DESCRIPTION OF THE DRAWINGS

The invention will be described with reference to the accompanying drawings, wherein like numbers reference like elements.

FIG. 3 is an explanatory view showing an example of the content of an SDP of an INVITE message.

FIG. 4 is an explanatory view showing an example of the content of an SDP of 200 OK message.

FIG. 9 is an explanatory view showing an example of the content of a capability reply in sequence [2].

FIG. 10 is an explanatory view showing an example of the content of a page information request in sequence [3].

FIG. 11 is an explanatory view showing an example of the content of a page information reply in sequence [4].

FIG. 12 is an explanatory view showing an example of the content of a data request in sequence [5].

FIG. 13 is an explanatory view showing an example of the content of a data reply in sequence [6].

FIG. 14 is an explanatory view showing an example of an XHTML-Print document.

FIG. 15 is an explanatory view showing an example of the content of a data request in sequence [7].

FIG. 16 is an explanatory view showing an example of the content of a data reply in sequence [8].

FIG. 17 is an explanatory view showing an example of the content of a page information reply in sequence [9].

DESCRIPTION OF EXEMPLARY EMBODIMENTS

Hereinafter, exemplary embodiments of the present invention will be described.

Figure 1:
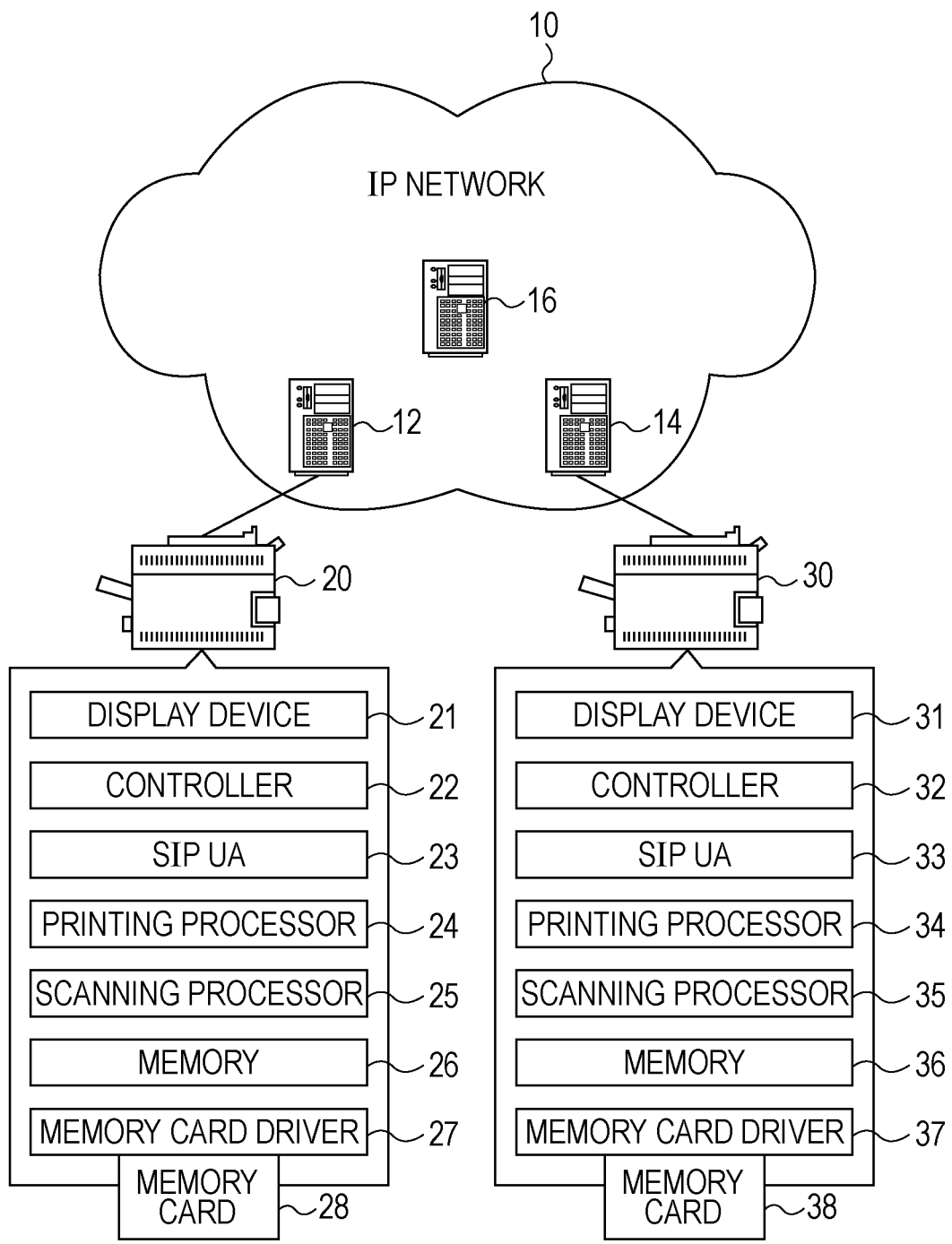
FIG. 1 is an explanatory view showing an IP network, a transmitting terminal, and a receiving terminal.

FIG. 1 is a configuration view showing an example of the configuration of a printing system that includes image processing apparatuses 20 and 30, which serve as printing apparatus terminals according to an exemplary embodiment of the invention, and an Internet Protocol (IP) network 10 connected to the image processing apparatuses 20 and 30. As shown in the figure, the image processing apparatuses 20 and 30 are connected to Session Initiation Protocol (SIP) proxy servers 12 and 14 of the IP network 10.

The IP network 10 is constructed as, for example, a Next Generation Network (NGN), and includes the SIP proxy servers 12 and 14, a location server 16, or the like. The SIP proxy servers 12 and 14 not only relay an IP message but also function as registrars that register location information (e.g., Uniform Resource Identifier (URI)) of user agents 23 and 33 of image processing apparatuses 20 and 30 in the location server 16.

The image processing apparatuses 20 and 30 are constructed as multifunction machines that can function as both a scanner and a printer. The image processing apparatuses 20 and 30 include display devices 21 and 31, which display a menu or image data, controllers 22 and 32, which control the entire apparatuses, user agents (SIPUAs) 23 and 33, which are for the SIP, printing processors 24 and 34, which print texts, image data, or the like, scanning processors 25 and 35, which obtain image data by scanning texts, images, or the like on a medium such as a sheet of paper, memories 26 and 36, which temporarily store data to be printed or image data obtained by scanning, card drivers 27 and 37, which write data in memory cards 28 and 38 or read data stored on the memory cards 28 and 38 when the memory cards 28 are 38 are connected, and the like.

In the following description, the image processing apparatus 20 will be referred to as a "transmitting terminal 20" and the image processing apparatus 30 will be referred to as a "receiving terminal 30" since it is assumed that image data scanned by the image processing apparatus 20 are transmitted as printing contents data from the image processing apparatus 20 through the IP network 10 to the image processing apparatus 30, which stores, upon receiving the printing contents data, only image data of the printing contents data on the memory card 38.

Figure 2:
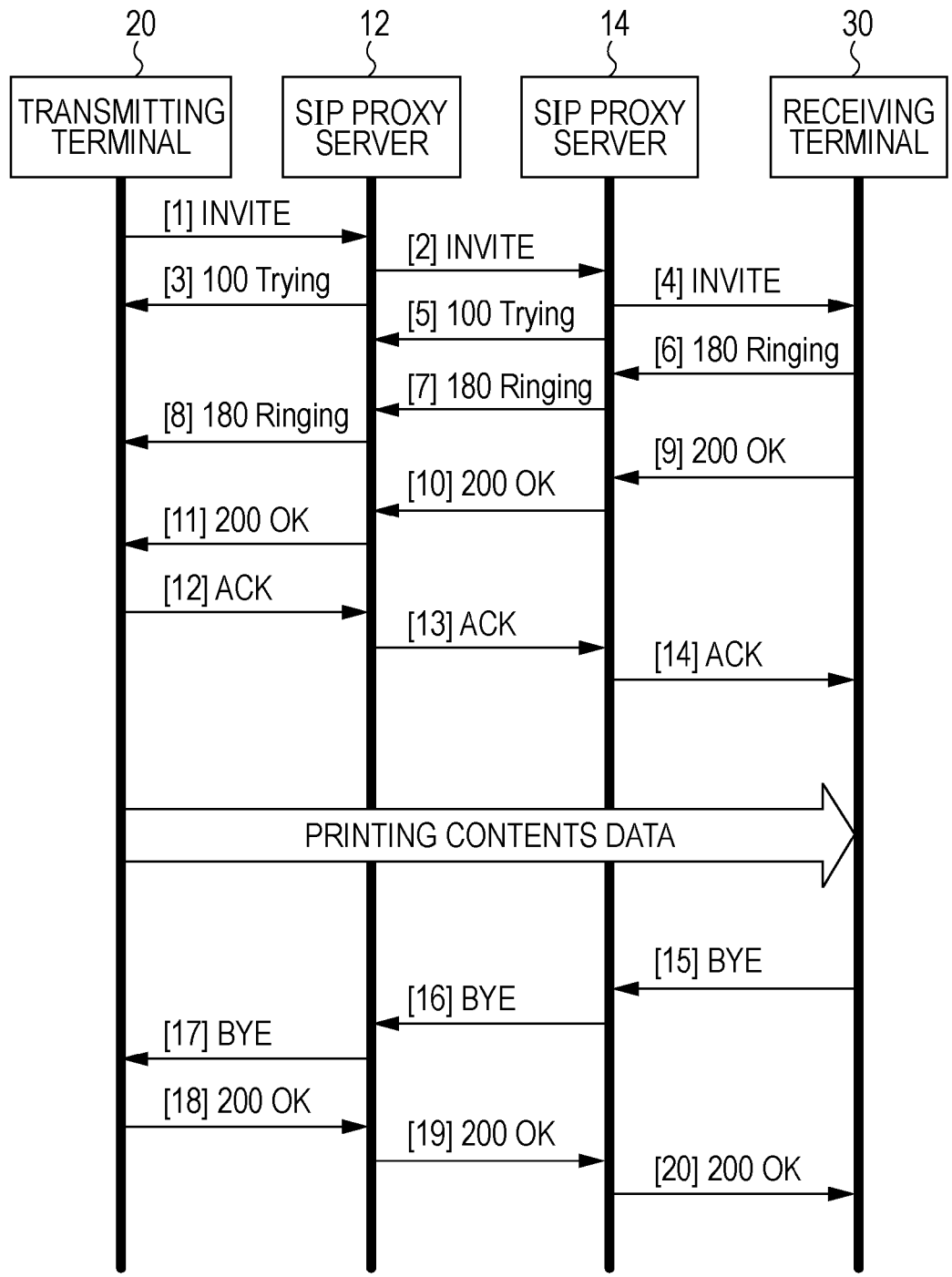
FIG. 2 is an explanatory view showing communication sequences between transmitting and receiving terminals.

FIG. 2 is an explanatory view showing communication sequences between the transmitting terminal 20 and the receiving terminal 30 based on the SIP, in which the transmitting terminal 20 transmits image data scanned by the transmitting terminal 20 as printing contents data to the receiving terminal 30 and, when the image data is received, the receiving terminal 30 prints the image data. The session establishment based on the SIP is initiated by the transmitting terminal 20 transmitting an INVITE message to the receiving terminal 30. The INVITE message from the transmitting terminal 20 is primarily transmitted to the SIP proxy server 12. The SIP proxy server 12 transmits a reply "100 Trying," which is a state code indicating that the message is being processed, to the transmitting terminal 20 and the INVITE message to the SIP proxy server 14 based on the Uniform Resource Identifier (URI) of the receiving terminal 30, which is described in the INVITE message. The SIP proxy server 14 transmits a reply "100 Trying," which is a state code indicating that the message is being processed, to the SIP proxy server 12 and the INVITE message to the receiving terminal 30 based on the URI of the receiving terminal 30, which is described in the INVITE message. The receiving terminal 30 transmits, upon receiving the INVITE message, a reply "180 Ringing," which is a state code indicating that it is being called. The reply "180 Ringing" is transmitted to the transmitting terminal 20 through the SIP proxy server 14 and the SIP proxy server 12. Afterwards, when the receiving terminal 30 transmits "200 OK," which is a state code indicating the success of a session establishment call, in response to the received INVITE message, "200 OK" is transmitted to the transmitting terminal 20 through the SIP proxy server 14 and the SIP proxy server 12. When "200 OK" is received, the transmitting terminal 20 transmits "ACK," which is a state code indicating an acknowledgment of the final reply to the INVITE message, to the receiving terminal 30 through the SIP proxy server 12 and the SIP proxy server 14. Through the above processing, the connection between the transmitting terminal 20 and the receiving terminal 30 is established, and the transmitting terminal 20 can transmit printing contents data to the receiving terminal 30. In addition, when the transmitting terminal 20 ends transmitting the printing contents data and the receiving terminal 30 ends printing the printing contents data or storing the image data, the receiving terminal 30 transmits "BYE," which is a state code for closing the session, to the transmitting terminal 20 through the SIP proxy server 14 and the SIP proxy server 12. In response to "BYE," the transmitting terminal 20 transmits "200 OK" to the receiving terminal 30 through the SIP proxy server 12 and the SIP proxy server 14, thereby closing the session. Since the session is established and closed through the SIP proxy server 12 and the SIP proxy server 14, an operator of the SIP proxy server 12 and the SIP proxy server 14 can calculate a price (i.e., charge a fee) for the service of the session establishment between the transmitting terminal 20 and the receiving terminal 30 by acquiring the date and time of the session establishment and the date and time of the session closing between the transmitting terminal 20 and the receiving terminal 30.

FIG. 3 is an explanatory view showing an example of the contents of a Session Description Protocol (SDP) in the INVITE message, transmitted from the transmitting terminal 20 according to an exemplary embodiment of the invention, and FIG. 4 is an explanatory view showing an example of the contents of an SDP in the "200 OK" message, transmitted from the receiving terminal 30 according to an exemplary embodiment of the invention. The SDP in FIGS. 3 and 4 form media describing sections. In the SDP, line "m=" indicates information of a media type or a transport address. Line "m=" in FIG. 3 indicates that an application prescribed in payload type "newprint1" using "Transmission Control Protocol (TCP)" is treated by port number "8080." Line "m=" in FIG.

4 indicates that an application prescribed in payload type "newprint1" using "TCP" is treated by port number "3180." Here, the description "newprint1" in line "m=" functions to identify as including the transmission and reception of the printing contents. Due to the description of "newprint1," the transmitting terminal 20 functions as a server in a server-client model, and the receiving terminal 30 functions as a client in the server-client model. In addition, "a=setup:passive" in FIG. 3 indicates that the transmitting terminal 20 functions as a "passive part" (server), and "a=setup:active" in FIG. 4 indicates that the receiving terminal 30 functions as an "active part" (client). In the SDP, line "C=" indicates the address of medium included in the session. Line "C=" in FIG. 3 indicates that the IP address of the transmitting terminal 20 is "xxx.xxx.xxx.xxx" using the description "IN IP4 xxx.xxx.xxx.xxx." Also, a description "newprint/capability.xml" in the last line "a=" in FIG. 3 is a Uniform Resource Locator (URL) of a requesting part, received first from the receiving terminal 30 after the session is established. Due to this description, the receiving terminal 30 functioning as a client in the server-client model can acquire the URL of a capability request, which is first requested to the transmitting terminal 20.

Figure 5:
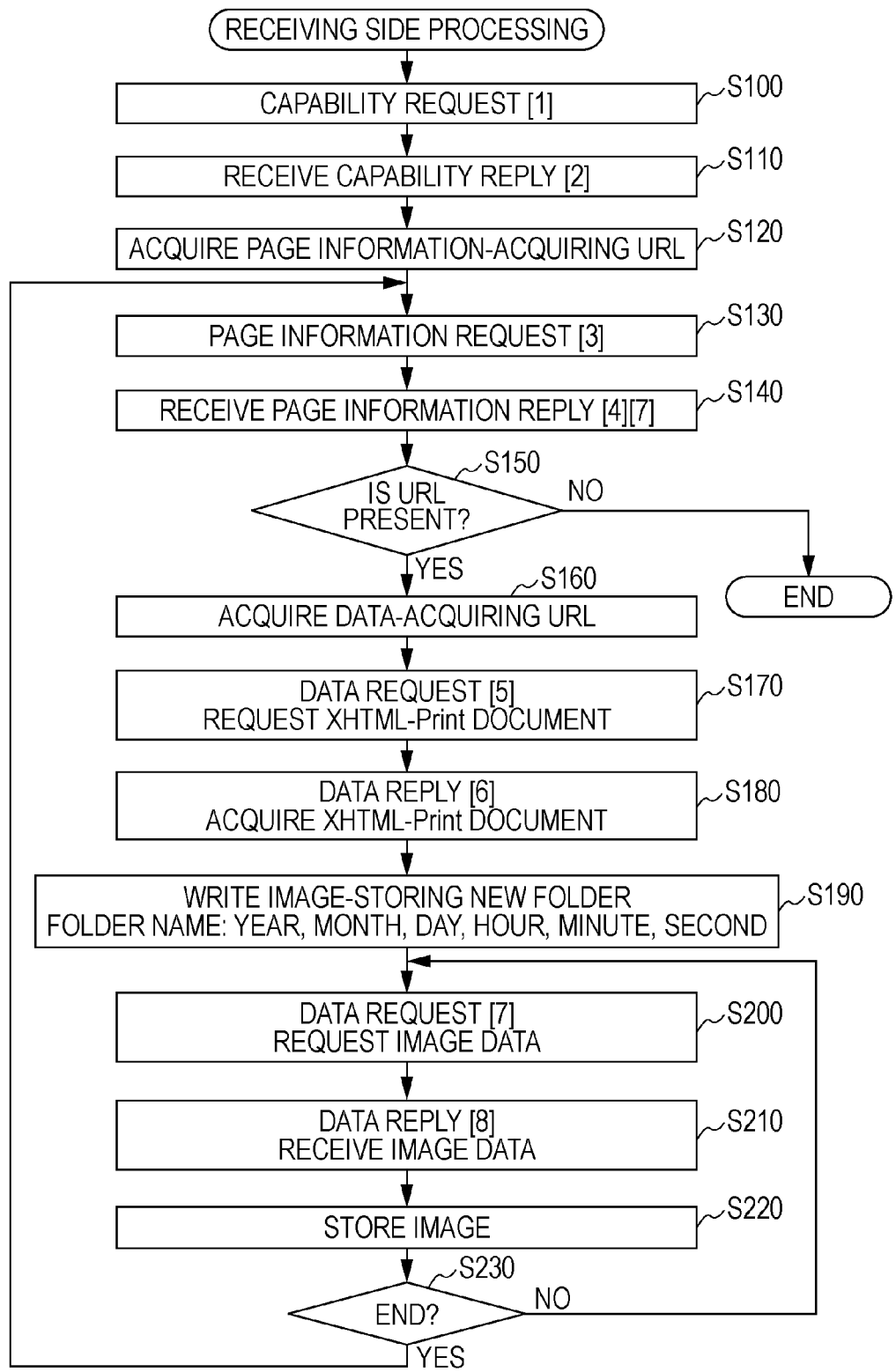
FIG. 5 is a flowchart showing receiving-side processing in the transmission and reception of printing contents data.
Figure 6:
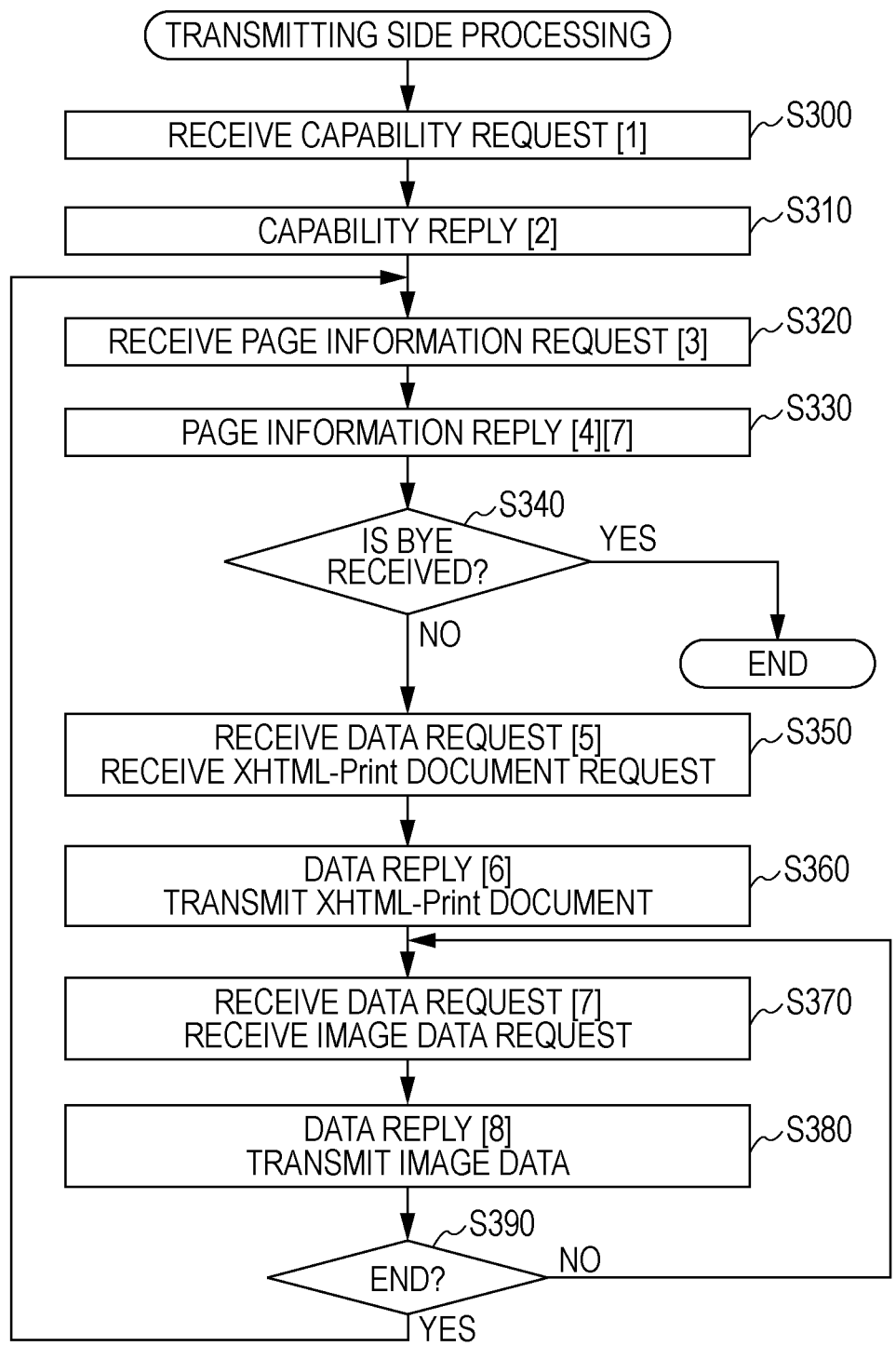
FIG. 6 is a flowchart showing transmitting-side processing in the transmission and reception of printing contents data.
Figures 7, 8:
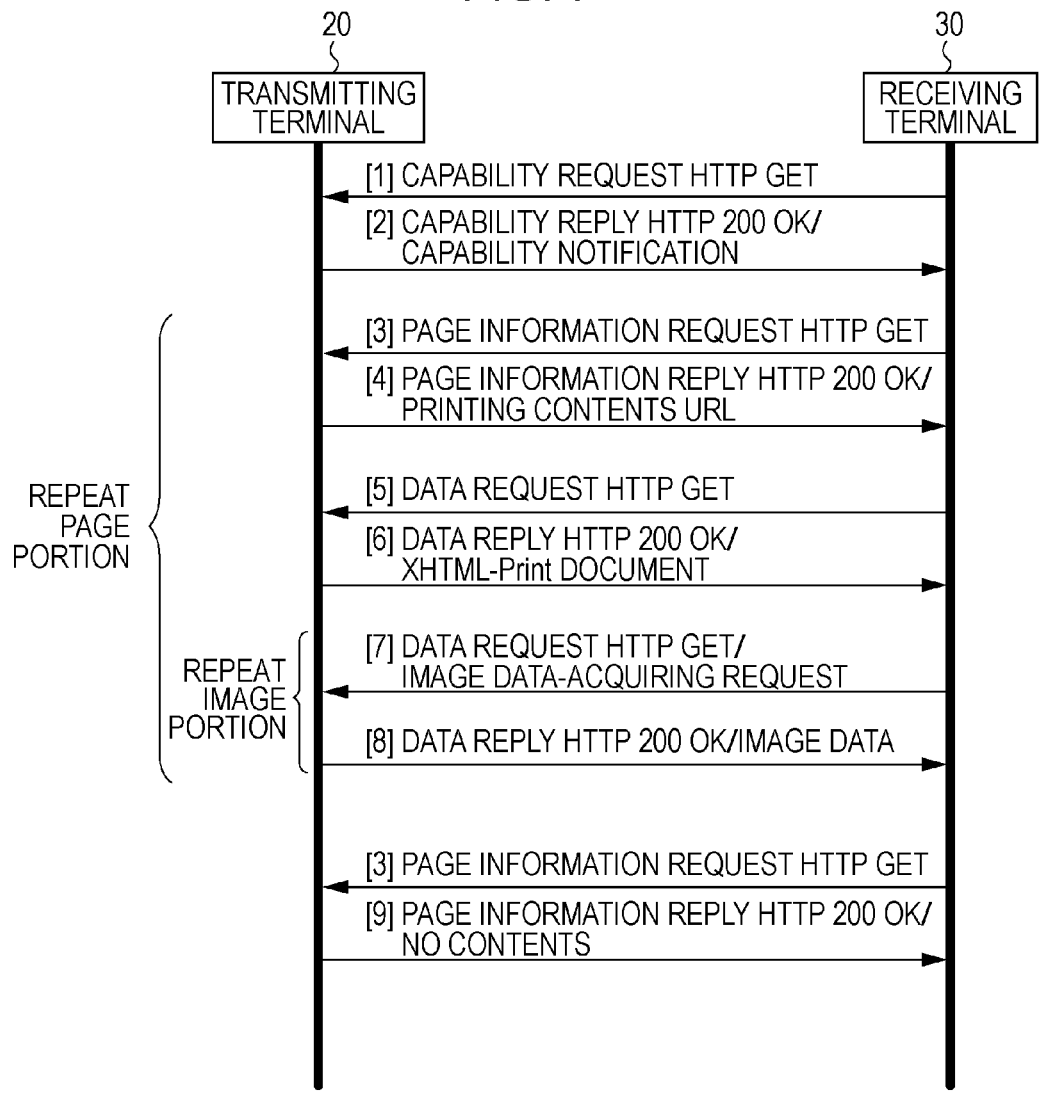
FIG. 7 is an explanatory view showing sequences in the transmission and reception of printing contents data.
FIG. 8 is an explanatory view showing an example of the content of a capability request in sequence [1].

FIG. 5 is a flowchart showing an example of receiving-side processing performed by the receiving terminal 30 when the transmitting terminal 20 transmits printing contents data to the receiving terminal 30, FIG. 6 is a flowchart showing transmitting-side processing performed by the transmitting terminal 20 when the transmitting terminal 20 transmits printing contents data to the receiving terminal 30, and FIG. 7 is an explanatory view showing sequences when the transmitting terminal 20 transmits printing contents data to the receiving terminal 30. For the sake of convenient explanation, a description will be given of the transmission and reception of the printing contents data and the storing of the image data of the printing contents data on the memory card 38 based on the sequences shown in FIG. 7, by referring to the receiving-side processing shown in FIG. 5 and the transmitting-side processing shown in FIG. 6 if necessary. In addition, as described above, when a session for the transmission and reception of the printing contents data is established, the transmitting terminal 20 functions as a server in a server-client model, and the receiving terminal 30 functions as a client in the server-client model. In this case, the transmitting terminal 20 is standing by a request from the receiving terminal 30.

When the session is established, the receiving terminal 30 performs a capability request by transmitting a capability request message to the transmitting terminal 20 (step S100 in FIG. 5 and step S300 in FIG. 6), and the transmitting terminal 20 performs a capability reply by transmitting a capability reply message to the printing apparatus terminal 30 in response to the capability request (step S310 in FIG. 6 and step S110 in FIG. 5). An example of the capability request message is shown in FIG. 8. In the capability request message, line 01 indicates a command indicating a "request," line 02 indicates the IP address of the transmitting terminal 20 acquired from the INVITE message, line 03 indicates the acceptance of an Extensible Markup Language (XML) text. An example of the capability reply message is shown in FIG. 9. In the capability reply message, line 01 is "200 OK" that indicates a success with respect to the request, and line 02 indicates that the type of contents is an XML text. As for the capability of the transmitting terminal 20, it can be seen, from this example, that file format ("DocumentFormat" in line 09) is XHTML-Print ("application/xhtml-print-x" in line 11) and media type ("MediaType" in line 15) is stationary ("stationery" in line 17) and photographic ("photographic" in line 18). In addition, line 24 of the capability reply message describes a URL ("newprint/capability1.xml" in line 24) for the later requesting of page information from the receiving terminal 30. The URL is a relative address with respect to the IP address "xxx.xxx.xxx.xxx" ("HOST:xxx.xxx.xxx.xxx" in line 02 of FIG. 8) of the transmitting terminal 20, which is described as the SDP in the INVITE message. Line 25 describes a URL ("newprint/event/" in line 25), which is for receiving status change information. The URL for receiving the status change information is a URL for the transmitting terminal 20 to receive information when the receiving terminal 30 has an abnormal state such as paper jamming or forgetting of the insertion of a memory card. When the capability replay message is received from the transmitting terminal 20, the receiving terminal 30 acquires the capacity of the transmitting terminal 20 from the capacity reply message while acquiring the URL ("newprint/capability1.xml" in line 24), which describes initial page information of the printing contents, or the URL ("newprint/event/" in line 25), which is for receiving the status change information (step S120 in FIG. 5).

Afterwards, the receiving terminal 30 performs a page information request by transmitting a page information request message using the acquired URL ("newprint/capability1.xml" in line 24 of the capability reply message in FIG. 9) to the transmitting terminal 20 (step S130 in FIG. 5 and step S320 in FIG. 6), and the transmitting terminal 20 performs a page information reply by transmitting a page information reply message to the receiving terminal 30 in response to the page information request (step S330 in FIG. 6 and step S140 in FIG. 5). An example of the page information request message is shown in FIG. 10. It can be seen that "newprint/capability1.xml" described in line 01 of the page information request message is the same as "newprint/capability1.xml" in line 42 of the capability reply message shown in FIG. 9. An example of the page information reply message is shown in FIG. 11. It can be seen that line 09 of the page information reply message describes the URL "newprint/xhtmlprint1.xml" of the printing contents data, and that line 10 describes the URL "newprint/capability2.xml" of the next page in the printing contents. When the page information reply message is received from the transmitting terminal 20, the receiving terminal 30 acquires the URL of the printing contents and/or the URL of the next page in the printing contents from the page information reply message if they are present in the page information reply message (step S150 and S160 in FIG. 5).

Next, the receiving terminal 30 performs a data request by transmitting a data request message to the transmitting terminal 20 using the acquired URL ("newprint/xhtmlprint1.xml" in line 09 of the page information reply message in FIG. 11) (step S170 in FIG. 5 and step S350 in FIG. 6), and the transmitting terminal 20 performs a data reply by transmitting a data reply message and data to the receiving terminal 30 in response to the data request (step S360 in FIG. 6 and step S180 in FIG. 5). An example of the data request message is shown in FIG. 12. It can be seen that "newprint/xhtmlprint1.xml" described in line 01 of the data request message is the same as "newprint/xhtmlprint1.xml" in line 09 of the page information reply message in FIG. 11. It can be seen, from line 01 of the data request message in FIG. 12, that requested data have file format "DocumentFormat," which is XHTML-Print "application/xhtml-print-x," and media type "MediaType," which is photographic "photographic." An example of the data reply message is shown in FIG. 13. The transmitting terminal 20 transmits the data reply message and an XHTML-Print document. An example of the XHTML-Print document is shown in FIG. 14. In this example, the location information of image data is a URL indicated by "epson.jpg" in line 51. If there is a plurality of the image data, the URL is described in a plurality of lines. As described above, the URL is also a relative address from the IP address "xxx.xxx.xxx.xxx" ("HOST:xxx.xxx.xxx.xxx" in line 02 in FIG. 8) of the transmitting terminal 20, which is described as the SDP in the INVITE message. When the transmitted XHTML-Print document is received, the receiving terminal 30 acquires the location information of the image data (i.e., the URL designated by "epson.jpg" in line 51 in FIG. 14) by scanning the received XHTML-Print document (step S180 in FIG. 5), and edits a new folder titled by year, month, date, hour, minute, and second of that time (e.g., "20090303142526" for indicating 2009 Mar. 3, 14 o'clock, 25:26) on the memory card 38 in order to store the image data (step S190 in FIG. 5).

Next, the receiving terminal 30 performs a data request by transmitting a data request message using the URL ("epson.jpg" in line 51 in FIG. 14) of image data acquired from the XHTML-Print document (step S200 in FIG. 5 and step S370 in FIG. 6), and the transmitting terminal 20 performs a data reply by transmitting a data reply message and image data to the receiving terminal 30 in response to the data request (step S380 in FIG. 6 and step S210 in FIG. 5). An example of the data request message is shown in FIG. 15. It can be seen that "epson.jpg" described in line 01 of the data request message is the same as "epson.jpg" in line 51 of the XHTML-Print document in FIG. 14. "Range" in line 03 is to designate a piece of data of the image data, which is supposed to the transmitted and received. In this exemplary embodiment, a description "bytes=0-1023" designates 1024 bytes from 0th byte to 1023rd byte of the image data. This range can be set in the range of a printing memory capacity, which is allocated to the print data to be transmitted to the memory card 38, among the total capacity of the memory 36 of the receiving terminal 30. In addition, if the printing memory capacity, which is allocated to the memory 36 of the receiving terminal 30, is sufficient, "Range" in line 03 may be omitted. In this case, all of the image data is designated. An example of the data reply message is shown in FIG. 16. In the data reply message, "Content-Length: 1024" in line 03 indicates that the data length is 1024 bytes and "Content-Range: bytes 0-1023/4096" in line 04 indicates that 1024 bytes from 0th byte to 1023rd byte among the total amount of data 4096 bytes are transmitted. The transmitting terminal 20 transmits the data, described in "Range" in line 03 of the data request message, on the data reply message to the receiving terminal 30. The receiving terminal 30 stores the transmitted image data in the new folder of the memory card 38 (step S220 in FIG. 5). The image data, which is stored on the memory card 38 as above, can be, of course, displayed on a display device 31 or printed by the printing processor 34. Then, the data request and data reply are performed repeatedly until the storage of all the image data in the new folder of the memory card 38 comes to an end (steps S200 to S230 in FIG. 5 and steps S370 to S390 in FIG. 6). In addition, the ending of the storage of all of the image data can be determined whether or not the image data is received and stored using all the URL of the image data acquired from the XHTML-Print document.

When all the image data in the XHTML-Print document has come to an end, the receiving terminal 30 sends a page information request to the transmitting terminal 20 using the URL "newprint/capability2.xml" of the next page, which is acquired by the page information reply from the transmitting terminal 20 in response to the page information request to the transmitting terminal 20 (step S130 in FIG. 5 and step S320 in FIG. 6). The transmitting terminal 20 performs a page information reply in response to the page information request (step S330 in FIG. 6 and step S140 in FIG. 5). In addition, a data request and a data reply for the acquisition of the XHTML-Print document are performed (steps S170 and S180 in FIG. 5 and steps S350 and S360 in FIG. 6), an edition of a new folder for storing image data on the memory card 38 is performed (step S190 in FIG. 5), and a data request and a data reply, for acquiring image data using the URL of the image data acquired from the XHTML-Print document and storing the acquired image data in a new folder of the memory card 38, are performed repeatedly (steps S200 to S230 in FIG. 5 and steps S370 to S390 in FIG. 6).

If neither the URL of the printing contents data nor the URL of the next page is present in the page information reply message received from the transmitting terminal 20, the receiving terminal 30 determines that the transmission of the printing contents has come to an end (step S150 in FIG. 5), and transmits "BYE" (see FIG. 2) to the transmitting terminal 20 in order to close the session. An example of the page information reply message, which is transmitted from the transmitting terminal 20 in response to the page information request from the receiving terminal 30 when the transmission of the printing contents comes to an end, is shown in FIG. 17. In the page information reply message, "none" in line 09 and "none" in line 10 indicate that neither the URL of the printing contents data nor the URL of the next page is present. When "BYE" is received (step S340 in FIG. 6), the transmitting terminal 20 transmits "200 OK" to the receiving terminal 30 in order to close the session. The transmission of "BYE" and "200 OK" is the same as described above.

In the printing system and the receiving terminal 30 according to an exemplary embodiment of the invention as described above, when "newprint1," which is for identifying that the transmission and reception of printing contents data is included, is described in line "m=" as a content of the SDP of the INVITE message in the establishment of the session, the transmitting terminal 20 functions as a server in the server-client model and the receiving terminal 30 functions as a client in the server-client model, so that the receiving terminal 30 receives the XHTML-Print document included in the printing contents data, transmitted from the transmitting terminal 20 in response to the request from the receiving terminal 30, acquires the URL of the image data from the XHTML-Print document, receives the image data using the acquired URL of the image data, and stores the received image data in the new folder of the memory card 38. As such, the transmission and reception of the contents data is performed in response to the request from the receiving terminal 30. Accordingly, it is possible to only the image data of the printing contents on the memory card 38. As a result, it is possible to properly receive the printing contents data via the IP network and store only the image data. In addition, it is possible to discriminate the image data of a plurality of XHTML-Print documents from each other since the image data are stored by editing new folders on the memory card 38 for the respective XHTML-Print documents.

In the printing system according to an exemplary embodiment of the invention, the transmitting terminal 20 corresponds to a "transmitting terminal," the receiving terminal 30 corresponds to a "printing apparatus terminal," and the IP network 10 corresponds to an "IP network." In the transmitting terminal 20 and the "transmitting terminal," the user agent SIPUA 23, which establishes the session by transmitting the INVITE message, in which "newprint1" is described in line "m=" as a content of the SDP of the INVITE message, for identifying as including the transmission and reception of printing content data, to the receiving terminal 30, corresponds to a "transmitting-side connection establishment processor." The controller 22, which functions as a server in the server-client model due to the description "newprint1" and performs the transmitting-side processing in shown in FIG. 6 by transmitting an XHTML-Print document included in the printing contents to the receiving terminal 30 in response to a request from the receiving terminal 30 and image data corresponding to the URL of the image data described in the XHTML-Print document to the receiving terminal 30, in response to a request from the receiving terminal 30, corresponds to a "printing contents transmitter." In the receiving terminal 30 and the "printing apparatus terminal," the memory 36 corresponds to a "memory," the printing processor 34 corresponds to a "printing processor," and the memory card driver 37 corresponds to a "memory card-mounting section." The user agent SIPUA 33, which establishes the session based on the transmission and reception of the INVITE message including "newprint1" described in line "m=" as a content of the SDP of the INVITE message transmitted from the transmitting terminal 20, for identifying as including the transmission and reception of printing content data, corresponds to a "receiving-side connection establishment processor." The controller 32, which functions as a server in the server-client model due to the description "newprint1" and performs the receiving-side processing in shown in FIG. 5 by receiving an XHTML-Print document included in the printing contents, transmitted from the transmitting terminal 20 in response to a request for the printing contents data, and acquires the URL of image data described in the XHTML-Print document, and stores the image data, transmitted from the transmitting terminal 20 in response to a request using the URL of the image data, in a new folder of the memory card 38. In addition, in the printing apparatus terminal according to an exemplary embodiment of the invention, the memory 36 corresponds to a "memory," the printing processor 34 corresponds to a "printing processor," and the memory card driver 37 corresponds to a "memory card-mounting section." The user agent SIPUA 33, which establishes the session based on the transmission and reception of the INVITE message including "newprint1" described in line "m=" as a content of the SDP of the INVITE message transmitted from the transmitting terminal 20, for identifying as including the transmission and reception of printing content data, corresponds to a "receiving-side connection establishment processor." The controller 32, which functions as a client in the server-client model due to the description "newprint1" and performs the receiving-side processing in shown in FIG. 5 by receiving an XHTML-Print document included in the printing contents, transmitted from the transmitting terminal 20 in response to a request for the printing contents data, and acquires the URL of image data described in the XHTML-Print document, and stores the image data, transmitted from the transmitting terminal 20 in response to a request using the URL of the image data, in a new folder of the memory card 38.

The printing system or the receiving terminal 30 according to an exemplary embodiment of the invention has been described as receiving the XHTLM-Print document included in the printing contents, acquiring the URL of the image data described in the XHTLM-Print document, and storing the image data, transmitted from the transmitting terminal 20 in response to the request using the URL of the image data, in the new folder of the memory card 38. However, it is also possible to cut a header of a received file and store the header on the memory card 38 if the document format "DocumentFormat" is Tagged Image File Format (tiff).

The printing system or the receiving terminal 30 according to an exemplary embodiment of the invention has been described as storing the image data by editing the new folder on the memory card 38 for each XHTML-Print document. However, it is also possible to store image data of a plurality of XHTML-Print documents for the establishment of one session in one new folder. In addition, it is also possible to select an existing folder instead of editing the new folder on the memory card 38.

The printing system according to an exemplary embodiment of the invention has been described that the transmitting terminal 20 functions as a server in the server-client model and the receiving terminal 30 functions as a client in the server-client model when "newprint1," which is for identifying as including the transmission and reception of the printing contents data, is described in line "m=" as the content of an SDP of the INVITE message in the establishment of the session. The identifier is not limited to "newprint1" but can be any form of description as long as it identifies as including the transmission and reception of the printing contents data in the INVITE message.

The receiving terminal 30 according to an exemplary embodiment of the invention has been described as being provided with both the scanning processor 35 and the memory card driver 37. The receiving terminal 30 may have one of the scanning processor 35 and the memory card driver 37 or may have neither of them.

The transmitting terminal 20 according to an exemplary embodiment has been described as including the printing processor 24, the scanning processor 25, and the memory card driver 27. However, the transmitting terminal 20 may have only some of the processor 24, the scanning processor 25, and the memory card driver 27 or may have none of them as long as it stores the printing contents data to be transmitted. In other words, the transmitting terminal 20 can have nay configuration as long as it can transmit the printing contents data and the list of printing contents.

While the present invention has been described with reference to certain exemplary embodiments thereof, the present invention is not intended to be limited by the above illustrated embodiments. Rather, various changes in form can be made without departing from the scope of the present invention.

The present invention is applicable to the manufacturing industry of printing systems, print apparatus terminals, and the like.

What is claimed is:

1. A printing system comprising: a transmitting terminal, which transmits printable printing contents, and a printing apparatus terminal, which receives and prints the printing contents, which are connected to the printing system via an Internet protocol network, wherein the transmitting terminal includes a transmitting-side connection establishment processor, which establishes a connection with the printing apparatus terminal via the Internet protocol network based on transmission and reception of a connection request message having printing identification information, which is for transmission and reception of the printing contents, and a printing contents transmitter, which functions as a server in a server-client model and transmits the printing contents to the printing apparatus terminal in response to a request from the printing apparatus terminal when the connection with the printing apparatus terminal is established based on the transmission of the connection request message having the printing identification information, and wherein the printing apparatus terminal includes a memory capable of temporarily storing data, a printing processor, which prints print data, a memory card-mounting section capable of mounting a memory card, a receiving-side connection establishment processor, which establishes a connection with the transmitting terminal via the Internet protocol network based on the transmission and reception of the connection request message having the printing identification information, and a received image storage controller, which functions as a server in the server-client model when the connection with the transmitting terminal is established based on the transmission of the connection request message having the printing identification information, receives the printing contents from the transmitting terminal by sending a request for transmission of the printing contents to the transmitting terminal, extracts only image data included in the received printing contents, and stores the extracted image data on the memory card mounted on the memory card-mounting section.

2. The printing system according to claim 1, wherein the received image storage controller edits a new folder on the memory card and stores the image data, included in the printing contents, in the edited new folder.

3. The printing system according to claim 1, wherein the received image storage controller acquires, if a description document which describes locating information indicating a storage location of the image data included in the printing contents is included, the image data based on the location information described in the description document and stores the acquired image data on the memory card.

4. The printing system according to claim 1, wherein the printing apparatus terminal further includes an image display section, which displays the image data stored on the memory card mounted on the memory card-mounting section.

5. A printing apparatus terminal, which is connected with a transmitting terminal, which transmits printable printing contents, via an Internet protocol network, receives the printing contents from the transmitting terminal and prints the received printing contents, the printing apparatus terminal comprising:

a memory capable of temporarily storing print contents; a printing processor, which prints the print contents; a memory card-mounting section capable of mounting a memory card; a receiving-side connection establishment processor, which establishes a connection with the transmitting terminal via the Internet protocol network based on the transmission and reception of a connection request message having printing identification information; a received image storage controller, which functions as a server in the server-client model when the connection with the transmitting terminal is established based on the transmission of the connection request message having the printing identification information, receives the printing contents from the transmitting terminal by sending a request for transmission of the printing contents to the transmitting terminal, extracts only image data included in the received printing contents, and stores the extracted image data on the memory card mounted on the memory card-mounting section; and wherein the received image storage controller acquires, if a description document which describes locating information indicating a storage location of the image data included in the printing contents is included, the image data based on the location information described in the description document and stores the acquired image data on the memory card.

6. The printing apparatus terminal according to claim 5, wherein the received image storage controller edits a new folder on the memory card and stores the image data, included in the printing contents, in the edited new folder.

7. The printing apparatus terminal according to claim 5, further comprising an image display section, which displays the image data stored on the memory card mounted on the memory card-mounting section.

* * * * *